United States Patent Office 3,204,866  
Patented Sept. 7, 1965

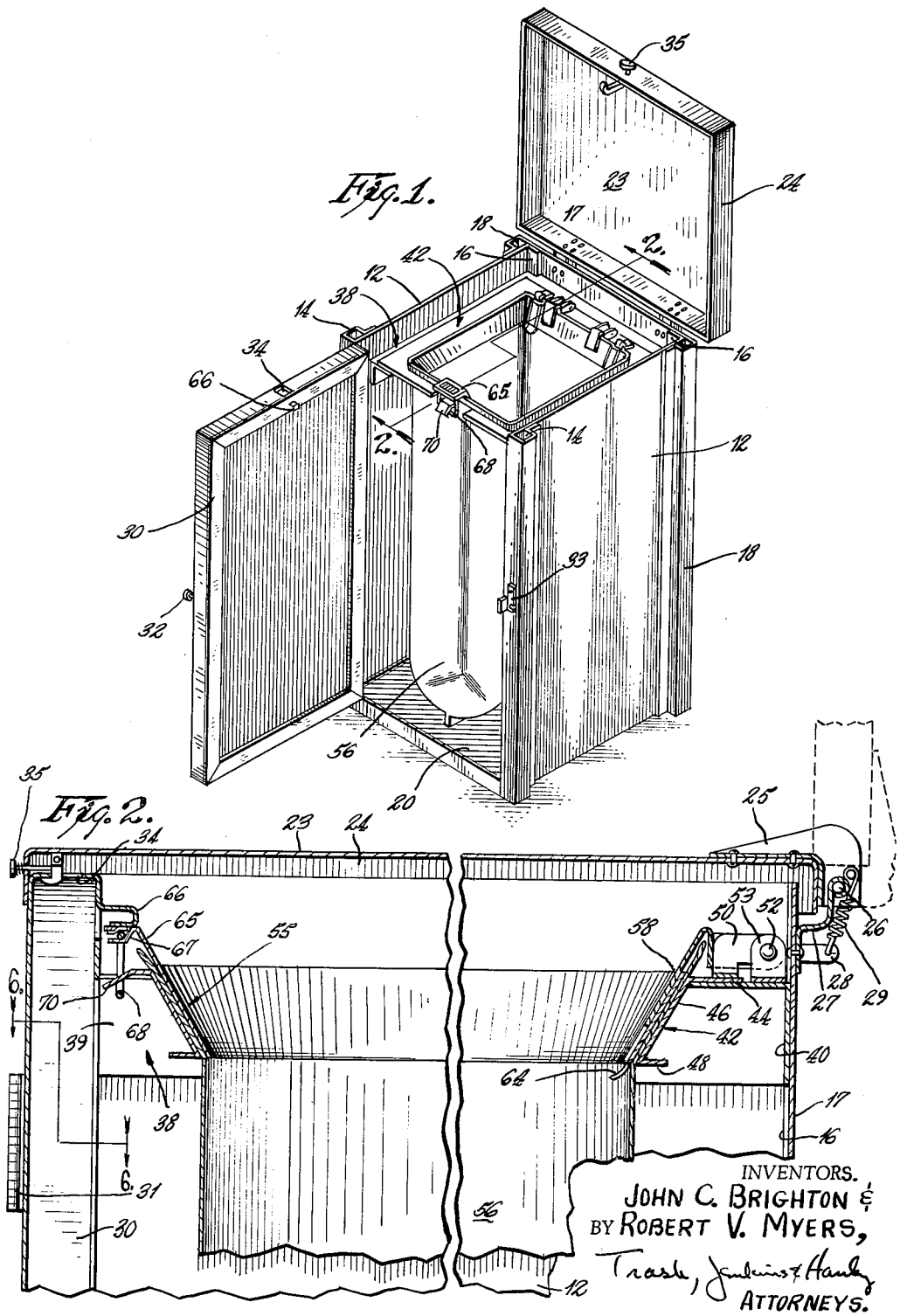

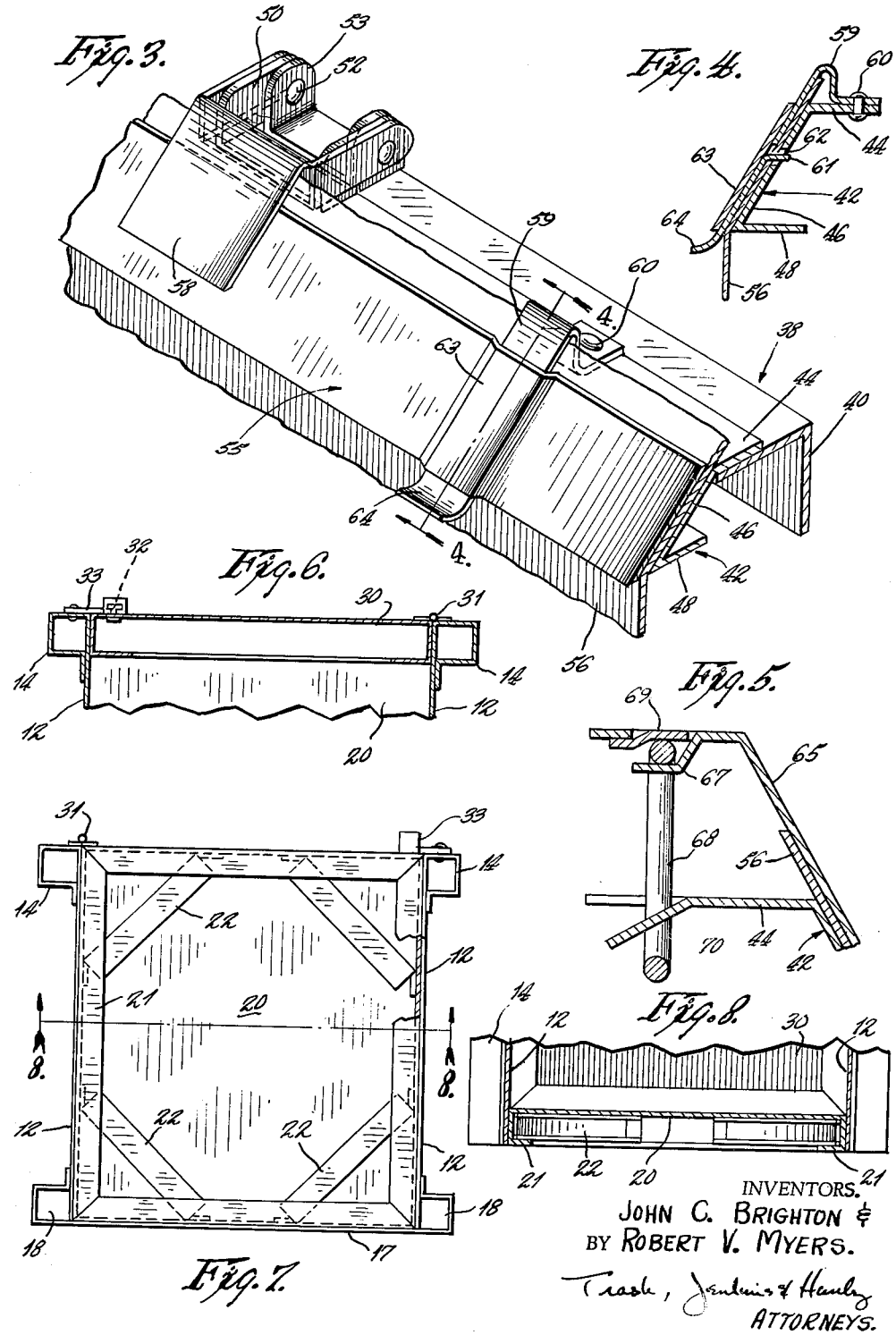

3,204,866  
REFUSE CONTAINER  
John C. Brighton and Robert V. Myers, Columbus, Ind., assignors to Arvin Industries, Inc., Columbus, Ind., a corporation of Indiana  
Filed Mar. 26, 1963, Ser. No. 267,998  
5 Claims. (Cl. 232—43.2)

This invention relates to a refuse container and more particularly to a refuse container empolying a disposable refuse bag.

It is an object of our invention to provide a refuse container of attractive appearance which can be inexpensively manufactured largely from economical sheet-metal, which may be used in combination with a disposable refuse holding bag, which will securely retain said bag in an open operative position but which will permit said bag to be quickly and easily placed in and removed from said operative position, and which will protect said bag from animals.

In accordance with one form of our invention, there is provided a housing having a plurality of interconnected sidewalls, with one of said sidewalls constituting a housing door. Said housing is provided with a floor adjacent its lower end, and a lid is provided on the top of the housing so that said housing provides a completely animal-proof enclosure.

A generally U-shaped frame is mounted in the housing adjacent the upper end thereof with its bight extending along the sidewall remote from the housing door. A first generally rectangularly shaped collar is hingedly connected to the frame bight and is provided with an inwardly angled wall portion continuous with an outwardly projecting flange engageable with said frame for supporting said collar in an operative position thereon. A second generally rectangular collar is also hingedly connected to the bight of said frame and is provided with an inwardly angled wall portion supported against the inner face of the inwardly angled wall portion of the first collar whereby the open upper end of a bag may be bindingly retained between the angled wall portions of the first and second collars. Means are provided on said first and second collars for releasably interconnecting them for movement of said second collar with and with respect to said first collar. In this manner, the pair of collars are swingable as a unit upwardly about their hinged interconnection to the frame, or alternatively, they are separately and independently swingable upwardly about their hinged connection to the frame for inserting and withdrawing the refuse bag from the container.

Other objects and features of our invention will become apparent from the more detailed description which follows and from the accompanying drawings, in which:

FIG. 1 is a perspective view of a refuse container embodying our invention;

FIG. 2 is an enlarged fragmentary vertical section taken on the line 2—2 of FIG. 1, but showing the door and lid in closed positions;

FIG. 3 is a fragmentary perspective view of the hinge mounting of the bag-retaining collars;

FIG. 4 is a fragmentary horizontal section taken on the line 4—4 of FIG. 3;

FIG. 5 is an enlarged vertical section of the front interconnection between the collars shown in FIG. 2;

FIG. 6 is a vertical section taken on the line 6—6 of FIG. 2;

FIG. 7 is a bottom plan view of the housing shown in FIG. 1; and

FIG. 8 is a fragmentary vertical section taken on the line 8—8 of FIG. 7.

Our refuse container comprises a housing formed from a plurality of interconnected sidewalls conveniently formed from sheet-metal. As shown in FIG. 1, a pair of sidewalls 12 have their forward ends bent outwardly and rearwardly upon themselves to form vertical stiffening channels 14. The rear ends of the sidewalls 12 are flanged inwardly, as at 16, and are rigidly connected to a back sidewall 17 having its lateral edges bent to form vertically extending channels 18 which are connected to the sidewalls 12. The lower end of the housing is enclosed by a floor 20 connected to the inner faces of the walls 12 and 17 adjacent the lower ends thereof. As shown in FIG. 8, the floor 20 has a downwardly displaced, inwardly extending flange 21, and a plurality of braces 22 are connected to the lower face of the floor with their ends interposed between said flange and floor.

The upper end of the housing is closed by a lid 23 having a depending border skirt 24. A pair of hinges 25 mounted on the rear of the lid are hingedly connected by pins 26 to a pair of brackets 27 on the housing back sidewall 17. Conveniently, the hinges 25 are connected to fingers 28 on the brackets 27 by springs 29 for biasing the lid toward its open positon shown in FIG. 1.

The front of the housing comprises a door 30 hingedly connected along one of its edges to one of the sidewall channels 14, as at 31. The opposite edge of said door is provided with a latch 32 engageable with a keeper 33 on the other sidewall channel 14. An opening 34 is provided in the upper edge of the door 30 for the reception of a lock 35 mounted on the front edge of the lid 23 for releasably locking said lid in closed position.

A U-shaped frame 38 having an L-shaped cross-section is mounted within the housing adjacent the upper end thereof with its arms 39 connected to the sidewalls 12 and its bight 40 connected to the back sidewall 17. Carried on the frame 38 in the general plane thereof is an outer generally rectangular collar 42 having an outwardly projecting flange 44 supported on the frame 38 and continuous with a downwardly and inwardly angled wall 46 terminating at its lower end in a stiffening flange 48. A pair of laterally spaced L-shaped hinge plates 50 are mounted on the rear stretch of the flange 44 and are connected by pins 52 to a pair of brackets 53 projecting upwardly from the frame bight 40. A second generally rectangular collar 55 is carried within the collar 42 and is also provided with an inwardly angled wall adapted to be supported against the angled wall 46 of the collar 42. In this manner, the open upper end of a disposable refuse bag 56 may be bindingly retained between the angled walls of the collars 42 and 55 to support said bag in the housing above the floor 20. Conveniently, the housing sidewalls and floor are located in proximate relation to the bag 56 to support the sides and bottom of said bag when they are bulged outwardly by refuse. A pair of laterally spaced hinge plates 58 are mounted on the rear stretch of the inner collar 55 and project rearwardly therefrom over the outer collar flange 44 for connection to the hinge pins 52 for swingably interconnecting the collar 55 to the housing. As shown in FIG. 2, the upper ends of the hinge plates 58 project substantially above the collar 55 so that the upper end of the bag may be fully inserted between the pair of collars.

In order to retain the bag 56 in place until it can be bindingly retained between the collars 42 and 55, a pair of laterally spaced rearwardly biased spring clips 59 are mounted, as at 60, on back stretch of the outer collar flange 44. Each of said clips extends downwardly over the wall 46 and is provided with a rearwardly struck finger 61 adapted to pierce the bag 56 and be received in an aligned opening 62 in the wall 46. The collar 55 has channels 63 received over the clips when it is in closed position, and the lower ends of said clips are turned upwardly as 64 to facilitate lifting them away from the wall 46.

As shown in FIGS. 2 and 5, a handle 65 extends upwardly and forwardly from the front stretch of the collar 55. A rearwardly projecting stop 66 is mounted on the door 30 to bear against the upper face of the handle 65 when the door is in closed position to insure that the inner collar 55 bears against the bag 56. A downwardly struck finger 67 is formed on the handle 65 to swingably support a depending rectangularly shaped loop 68 retained on said finger by a spring clip 69 mounted on said handle. The loop 68 is releasably engageable with a forwardly and downardly angled tongue 70 formed on the front stretch of the inner collar flange 44. As will be apparent, with the loop 68 engaging the tongue 70, the inner and outer collars 55 and 42 may be swung upwardly as a unit with respect to the frame 38 about the axis of the hinge pins 52. Alternatively, by swinging the loop 68 forward to disengage it from the tongue 70, the inner and outer collars may be swung independently and separately of each other about the axis of the pins 52.

In order to insert the bag 56 in the container, the lid 23 and door 30 are moved into their open positions. The loop 68 is then disengaged from the tongue 70 and the inner collar 55 is swung upwardly about the axis of the pins 52. The open end of the bag 56 is then disposed against the angled outer collar wall 46 and is retained on the collar 42 by the fingers 61 on the clips 59. If desired, the outer collar 42 may be swung upwardly about the pins 52 for easier insertion of the bag within said outer collar. The front edge of the bag 56 is manually held in place while the inner collar 55 is swung downwardly against the inner face of the bag to thus bindingly retain said bag between the angled faces of the inner and outer collars. As the inner collar 55 is lowered, its loop 68 will slide over and under the outer collar tongue 70. The door 30 is then closed with its stop 66 engaging the inner collar handle 65 to insure that the inner collar bears against the bag 56, and the lid 23 is then closed.

To remove the bag from the container, the lid 23 and door 30 are again opened, and the inner collar loop 68 is swung free of the finger 70 to permit the inner collar 55 to be swung upwardly about the pins 52. This releases the binding grip on the bag, and said bag, because of the weight of the material carried in it, will rip off of the bag-piercing fingers 61 so that it can be removed from the housing. Since there is no front stretch on the frame 38, the bag may be easily slid out the front of the housing when the collars 42 and 55 are lifted irrespective of whether or not the bag is over filled. With the bag removed, a new bag may be inserted in the housing in the manner previously described and the container is again ready for use. As an alternative method of removing the bag, the handle 65 may be lifted and the inner collar 55 will swing upwardly until the loop 68 engages the finger 70 thus releasing the binding engagement of the inner and outer collars with the bag and permitting it to rip off of the fingers 61. Continued upward swinging of the inner collar 55 will cause the loop 68 to bear against the finger 70 to swing both the inner and outer collars upwardly as a unit to clear the top of the bag 56 and the frame 38.

Although it is not shown in the drawings, it is, of course, possible to mount foot extensions on the channels 14 and form aligned openings in the upright channels 18 for the reception of a wheel-carrying axle so that the refuse container may be wheeled from one location to another.

We claim:

1. A refuse container, comprising
   (a) a housing having a plurality of interconnected sidewalls, one of said sidewalls forming a housing door,
   (b) a lid closing the top of said housing,
   (c) a generally U-shaped frame mounted in said housing adjacent the upper end thereof with its bight extending along the sidewall remote from said door,
   (d) a first generally rectangular collar having an outwardly projecting flange engageable with said frame for supporting said collar thereon and an inwardly angled wall portion,
   (e) a second generally rectangular collar supported against the inner face of said inwardly angled wall portion of said first collar whereby the open end of a bag may be bindingly retained between said first and second collars,
   (f) pairs of hinges mounted on said first and second collars swingably interconnected on a common axis to the bight of said frame for movement of said collars between an operative position in the general plane of said frame and an open position in which they are angled upwardly from said frame,
   (g) a handle projecting forwardly from said second collar over said first collar, and
   (h) a loop swingably mounted on said handle and releasably engageable with a downwardly angled tongue on said first collar whereby said first and second collars may swing about said common axis as a common unit and as separate units.

2. A refuse container as set forth in claim 1 with the addition that
   (a) a stop is mounted on said door for engagement with the upper face of said handle upon movement of said door to a closed position for retaining said second collar in binding engagement with the bag interposed between said collars.

3. A refuse container, comprising
   (a) a generally U-shaped frame,
   (b) a first generally rectangular collar having an outwardly projecting flange engageable with said frame for supporting said collar thereon and an inwardly angled wall portion,
   (c) a second collar having an inwardly angled wall supported against the inwardly angled wall portion of said first collar for bindingly retaining the open end of a bag between said collars,
   (d) pairs of hinges mounted on said first and second collars swingably interconnected on a common axis to the bight of said frame for movement of said collars between an operative position in the general plane of said frame in which said first collar is supported on said frame along the length thereof and said second collar is supported on said first collar along the length thereof and an open position in which said collars are angled upwardly from said frame,
   (e) means for supporting said frame in an elevated generally horizontal orientation,
   (f) means releasably interconnecting said first and second collars whereby said second collar is movable with and with respect to said first collar, and
   (g) means on said first collar adjacent the frame bight spring-biased against the inwardly angled wall portion of said first collar for bindingly retaining said bag against said wall portion.

4. A refuse container, comprising
   (a) a housing having a plurality of interconnected sidewalls, one of said sidewalls forming a housing door,
   (b) a lid closing the top of said housing,
   (c) a generally U-shaped frame mounted in said housing adjacent the upper end thereof with its bight extending along the sidewall remote from said door,
   (d) a first generally rectangular collar having an outwardly projecting flange engageable with said frame for supporting said collar thereon and an inwardly angled wall portion, (e) a second generally rectangular collar supported against the inner face of said inwardly angled wall portion of said first collar whereby the open end of a bag may be bindingly retained between said first and second collars, (f) pairs of hinges mounted on said first and second collars swingably interconnected on a common axis to the bight of said frame for movement of said collars between an operative position in the general plane of said frame and an open position in which they are angled upwardly from said frame, (g) a pair of clips mounted on the side of the first collar adjacent the frame bight and spring-stressed against the inwardly angled wall portion of said first collar, said clips having outwardly struck bag-piercing fingers formed thereon, and (h) means releasably interconnecting said first and second collars wheretby said first collar is movable with and with respect to said second collar.

5. A refuse container as set forth in claim 4 in which, (a) said second collar has a pair of channels receivable over said clips when second collar is supported against said first collar, and (b) said clips project below the plane of first collar.

References Cited by the Examiner
UNITED STATES PATENTS

| | | | |
|---|---|---|---|
| 652,331 | 6/00 | Rudolph | 232—43.2 |
| 696,832 | 4/02 | Maschke | 232—43.2 |
| 1,363,012 | 12/20 | Price | 248—101 |
| 1,556,462 | 10/25 | Torske | 248—101 |
| 2,421,740 | 6/47 | Birch | 248—101 |
| 2,965,344 | 12/60 | Baker | 248—101 |

FRANK B. SHERRY, *Primary Examiner.*